US012744409B2

(12) United States Patent
Lee et al.

(10) Patent No.: US 12,744,409 B2
(45) Date of Patent: Sep. 22, 2026

(54) RESONANT REGULATING RECTIFIER

(71) Applicant: Korea University Research and Business Foundation, Seoul (KR)

(72) Inventors: Hyung-Min Lee, Seoul (KR); Hyun-Su Lee, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 154 days.

(21) Appl. No.: 18/909,716

(22) Filed: Oct. 8, 2024

(65) Prior Publication Data

US 2025/0125742 A1 Apr. 17, 2025

(30) Foreign Application Priority Data

Oct. 16, 2023 (KR) ........................ 10-2023-0137743

(51) Int. Cl.
*H02J 50/12* (2016.01)
*H02J 50/10* (2016.01)

(52) U.S. Cl.
CPC ............... *H02J 50/12* (2016.02); *H02J 50/10* (2016.02)

(58) Field of Classification Search
CPC ............. H02J 50/00; H02J 50/10; H02J 50/12
See application file for complete search history.

(56) References Cited

U.S. PATENT DOCUMENTS 10,270,361 B2 * 4/2019 Hung ...................... H02M 1/08
2011/0254379 A1 * 10/2011 Madawala .............. B60L 53/12 307/104
2020/0144927 A1 5/2020 Le et al.
2023/0128630 A1 4/2023 Teeneti et al.

FOREIGN PATENT DOCUMENTS

KR 10-2013-0132624 A 12/2013
KR 10-1818591 B1 1/2018
KR 10-1847256 B1 5/2018
KR 10-1904336 B1 10/2018
KR 10-2023-0102683 A 7/2023

OTHER PUBLICATIONS

Notice of Allowance issued on May 14, 2025, for corresponding Korean Patent Application No. 10-2023-0137743, with an English Machine translation (4 pages).
Sohmyung Ha et al., "A fully integrated RF-powered Energy-Replenishing Current-Controlled Stimulator", IEEE Transactions on Biomedical Circuits and Systems, vol. 13, No. 1, Feb. 2019, pp. 191-202, (13 pages).
Yan Lu et al, "A Dual-Ouput Wireless Power Transfer System With Active Rectifier and Three-Level Operation", IEEE Transactions on Power Electronics, vol. 32, No. 2, Feb. 2017, pp. 927-930, (5 pages).

* cited by examiner

*Primary Examiner* — Alex Torres-Rivera
(74) *Attorney, Agent, or Firm* — Hauptman Ham, LLP

(57) ABSTRACT

The present disclosure relates to a resonant regulating rectifier, including an input unit that receives wireless power; and a resonant regulating rectification unit that modulates and rectifies a voltage level of the wireless power based on PWM according to a first demand voltage of a first load and a second demand voltage of a second load to apply a first target voltage to the first load through a first output transistor, and apply a second target voltage to the second load through a second output transistor. This may allow another output to be generated by utilizing a section wasted in a PWM method that modulates a voltage width, thereby reducing wasted energy.

6 Claims, 7 Drawing Sheets

RESONANT REGULATING RECTIFIER

CROSS-REFERENCE TO RELATED APPLICATION(S)

The present application claims the benefit of priority to Korean Patent Application No. 10-2023-0137743 filed on Oct. 16, 2023, in the Korean Intellectual Property Office. The aforementioned application is hereby incorporated by reference in its entirety.

BACKGROUND OF THE INVENTION

Field of the Invention

The present disclosure relates to a resonant regulating rectifier capable of increasing an amount of wireless transmission power received.

Background of the Related Art

A technology that supplies power to an electronic device wirelessly, which is called wireless power transfer (WPT), is emerging as an alternative to supplying power thereto through wired means.

A WPT system transmits and receives power through a change in a magnetic field of a coil at transmitting and receiver ends thereof. The receiving end, usually having a two-stage structure form, includes an AC-DC rectifier and a DC-DC converter.

An AC-DC rectifier converts an AC voltage $V_{INN}$ into a DC voltage $V_{REC}$, wherein $V_{REC}$ is not set to a target voltage value through feedback, but varies depending on a distance between coils, an angle, and a load RL.

Therefore, a DC-DC converter is essentially required at a back end thereof, wherein the DC-DC converter converts an unstable DC voltage $V_{REC}$ into a stable and targeted DC voltage $V_{REG}$ through feedback.

Such a two-stage system passes through two structures, and thus has a disadvantage in that power conversion efficiency calculated by power transmitted to the load RL/AC input power to a rectifier is low.

Furthermore, it has a disadvantage of having a low voltage conversion ratio calculated as a maximum value of DC voltage $V_{REC}$/AC voltage $V_{INN}$ as well as having a large chip size due to a two-stage structure.

Accordingly, a resonant regulating rectifier that reduces the two-stage structure form to a one-stage structure form has been proposed. FIG. 1 is a drawing for explaining a resonant regulating rectifier to which a conventional voltage width modulation (hereinafter referred to as pulse width modulation (PWM)) technology is applied. In this resonant regulating rectifier having a one-stage structure, a PWM technology is applied thereto as shown in FIG. 1 to convert an AC voltage $V_{INN}$ into a DC voltage $V_{REG}$ to achieve a stable and targeted DC voltage. In FIG. 1, $V_{TG}$ may mean a targeted DC voltage.

That is, the PWM technology is a technology that compares $V_{REG}$ With $V_{TG}$, which is a target voltage, to modulate a length of a gate voltage $V_{G1}$, which is a pulse width signal, so as to make the DC voltage $V_{REG}$ and the target voltage $V_{TG}$ to be the same.

FIG. 2 is a drawing for explaining a disadvantage of a one-stage resonant regulating rectifier to which a conventional PWM technology is applied. The conventional PWM technology, as shown in FIG. 2, has a problem in that power in a section where the AC voltage $V_{INN}$ is greater than the DC voltage $V_{REG}$, existing outside a section where the gate voltage $V_{G1}$ transmits power to the DC voltage $V_{REG}$, is converted into heat in a parasitic resistance (equivalent series resistor: ESR) of an L2C2 resonant stage to cause a heat issue, and there occurs a section where energy is wasted in the existing PWM.

Therefore, there is a need to utilize the section wasted in the conventional PWM technology.

CITATION LIST

Patent Literature (Patent Literature 0001) Korean Patent Publication No. 10-2013-0132624

SUMMARY OF THE INVENTION

The present disclosure is contrived to solve the foregoing problems, and an aspect of the present disclosure is to provide a resonant regulating rectifier capable of reducing wasted energy through generating another output by utilizing a section wasted in a PWM method that modulates a voltage width.

In order to achieve the foregoing objectives, a resonant regulating rectifier according to one embodiment of the present disclosure may include an input unit that receives wireless power; and a resonant regulating rectification unit that modulates and rectifies a voltage level of the wireless power based on PWM according to a first demand voltage of a first load and a second demand voltage of a second load to apply a first target voltage to the first load through a first output transistor, and apply a second target voltage to the second load through a second output transistor, wherein the resonant regulating rectification unit includes a dual output comparator that applies a first gate signal in consideration of the first demand voltage to a gate of the first output transistor, and applies a second gate signal in consideration of the second demand voltage to a gate of the second output transistor within a section in which the voltage level is greater than the first demand voltage.

Furthermore, the dual output comparator may include a common gate comparator that outputs a common gate voltage signal including start point and end point information of the section as a difference between the voltage level and the first demand voltage; a first PWM circuit that outputs a first delay signal including end point information of the first gate signal that causes the first target voltage to satisfy the first demand voltage; a first demand voltage driver that generates the first gate signal according to the common gate voltage signal and the first delay signal; a second PWM circuit that outputs a second delay signal including end point information of the second gate signal that causes the second target voltage to satisfy the second demand voltage; and a second demand voltage driver that generates the second gate signal according to the first gate signal and the second delay signal.

In addition, the resonant regulating rectification unit may further include a first pulse width limiter that transmits an end point threshold signal of the first gate signal, which includes critical point information for the second gate signal that follows the first gate signal to be present within the section, to the first demand voltage driver so as to limit a pulse width of the first gate signal; and a second pulse width limiter that receives the second delay signal and the common gate voltage signal, and transmits an end point threshold signal of the second gate signal, which includes a point that satisfies the second demand voltage and the end point information of the section so as to limit a pulse width of the second gate signal.

Furthermore, the first demand voltage driver may be configured to receive the common gate voltage signal to generate a falling edge at a start point of the section, select a signal indicating a preceding point from between the first delay signal and an end point threshold signal of the first gate signal, and generate the first gate signal by producing a rising edge at a point corresponding to the selected signal.

In addition, the second demand voltage driver may be configured to receive the first gate signal to generate a falling edge at an end point of the first gate signal, and receive an end point threshold signal of the second gate signal to generate the second gate signal by producing a rising edge at a preceding point from between a point that satisfies the second demand voltage and an end point of the section.

Furthermore, the first pulse width limiter may include a replication transistor connected in parallel to the first output transistor to replicate a current flowing in the first output transistor; a current replicator comprising a current-voltage converter that converts a drain current of the replication transistor into a voltage value, the current replicator outputting a signal notifying when the converted voltage value exceeds a critical value and a voltage width storage device comprising a delay line that delays the common gate voltage by a predetermined delay unit from a start point of the section, a first D-flipflop group that converts a width of the first gate signal into a digital value based on the predetermined delay unit, and a second D-flipflop group that updates the converted digital value, the voltage width storage device locking, when a signal is received from the current replicator, the digital value to memorize a voltage width at the locked point as the critical point information.

According to an aspect of the present disclosure described above, a resonant regulating rectifier may be provided to generate another output by utilizing a section wasted in a PWM method that modulates a voltage width, thereby reducing wasted energy.

DETAILED DESCRIPTION OF THE PREFERRED EMBODIMENT

Figure 1:
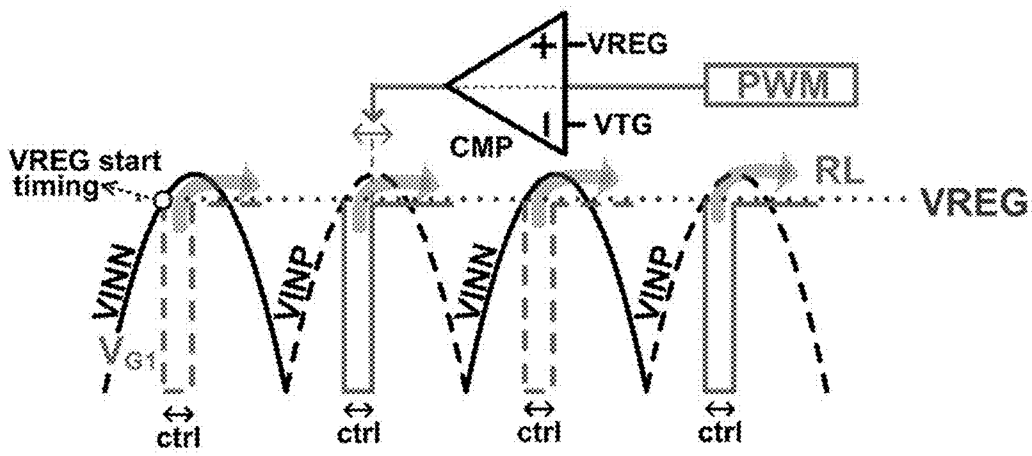
FIG. 1 is a drawing for explaining a resonant regulating rectifier to which a conventional voltage width modulation technology is applied.
Figure 1:
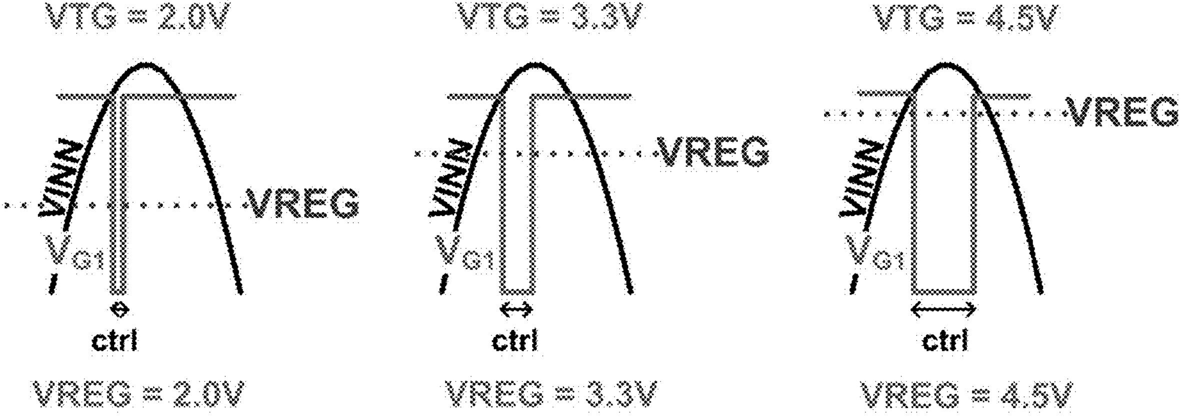
Figure 2:
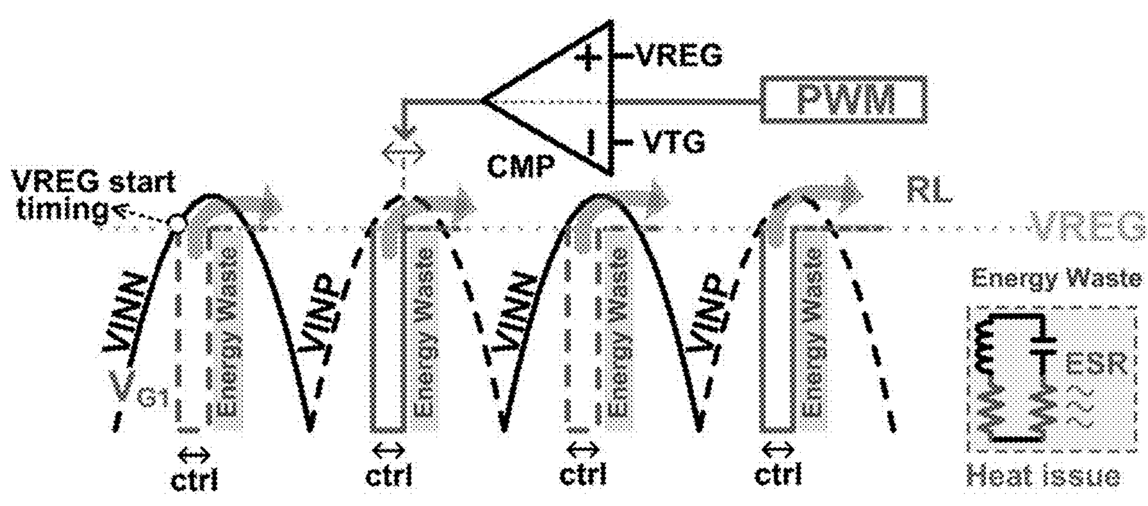
FIG. 2 is a drawing for explaining a disadvantage of a resonant regulating rectifier having a one-stage structure to which a conventional PWM technology is applied.

The detailed description of the present disclosure described below refers to the accompanying drawings, which show, by way of illustration, specific embodiments to carry out the present disclosure. These embodiments are described in sufficient detail to enable those skilled in the art to carry out the present disclosure. It should be understood that various embodiments of the present disclosure are different from one another but are not necessarily mutually exclusive. For example, specific shapes, structures and characteristics described herein may be implemented in other embodiments without departing from the concept and scope of the present disclosure in connection with one embodiment. In addition, it should be understood that the locations or arrangement of individual elements within each disclosed embodiment may be changed without departing from the concept and scope of the present disclosure. Therefore, the following detailed description is not to be taken in a limiting sense, and the scope of the present disclosure is defined only by the appended claims along with the entire scope of equivalents thereof, if properly described. The similar reference numerals refer to the same or similar functions in various aspects.

Elements according to the present disclosure may be elements that are defined not by physical properties but by functional properties, and thus each element may be defined by its function. Each element may be implemented as hardware and/or a program code and a processing unit (or processor) for performing a function thereof, and functions of two or more elements may also be included and implemented in a single element. Accordingly, it should be noted that names of elements in embodiments to be described below are given to imply representative functions performed by each of the elements: rather than to physically distinguish each of the elements, and the technical spirit of the present disclosure is not limited by the names of the elements.

Hereinafter, preferred embodiments of the present disclosure will be described in more detail with reference to the drawings.

Figure 3:
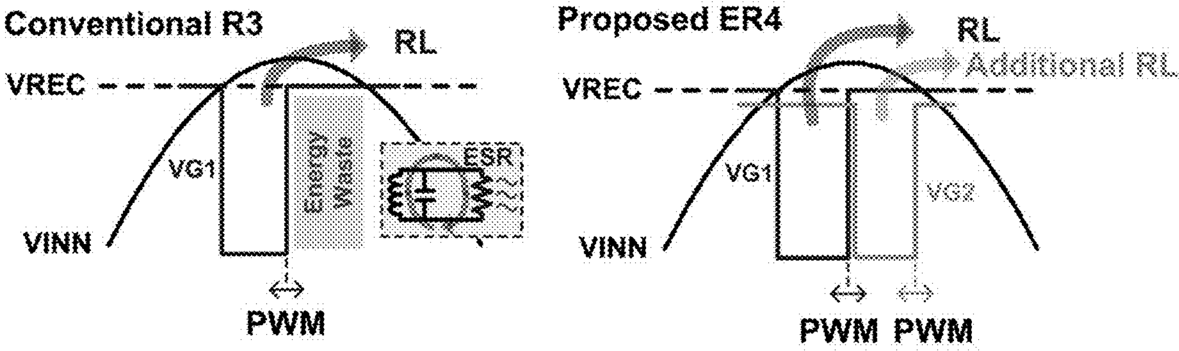
FIG. 3 is a drawing for explaining a resonant regulating rectifier according to one embodiment of the present disclosure in comparison with a conventional PWM technology.
Figure 4:
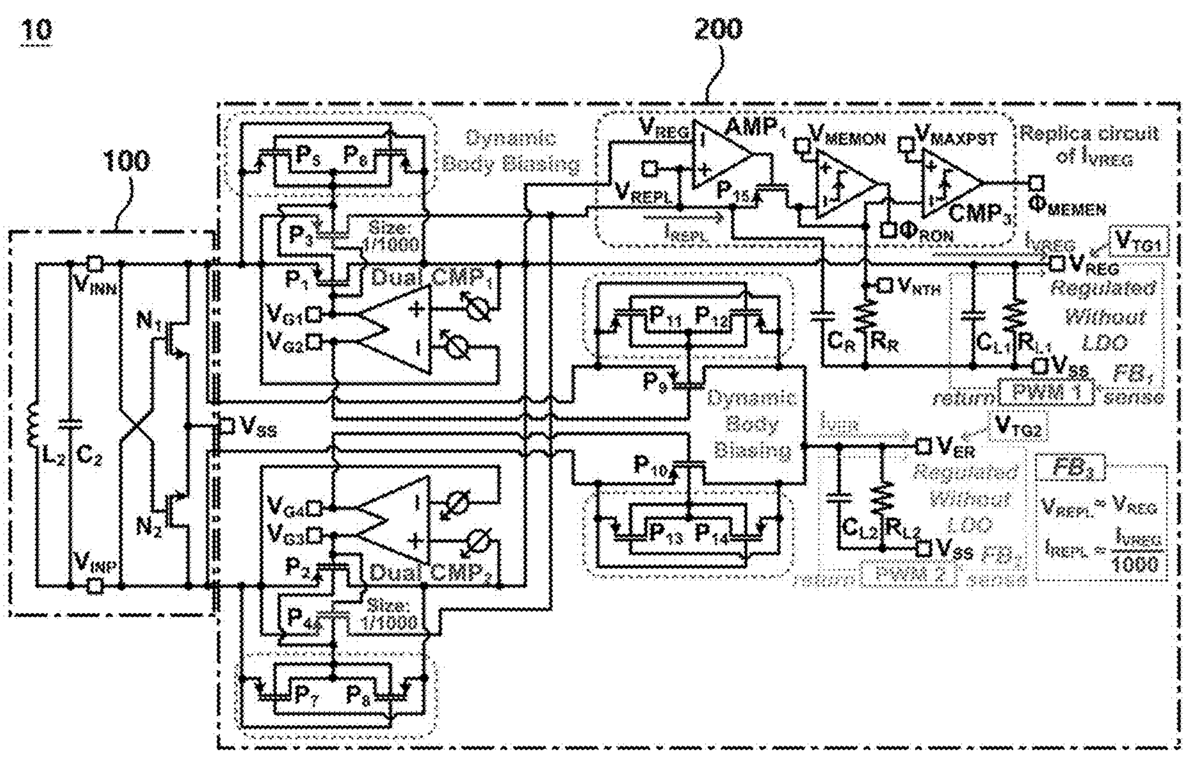
FIG. 4 is a circuit diagram for explaining for a resonant regulating rectifier according to one embodiment of the present disclosure.
Figure 4:
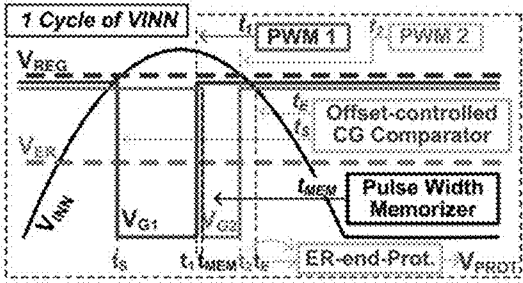

FIG. 3 is a drawing for explaining a resonant regulating rectifier according to one embodiment of the present disclosure in comparison with a conventional PWM technology, and FIG. 4 is a circuit diagram for explaining a resonant regulating rectifier 10 according to one embodiment of the present disclosure.

The resonant regulating rectifier 10 according to this embodiment is provided to reduce wasted energy through generating another output by making maximum use of the wasted section in the existing PWM as shown in FIG. 3.

To this end, the resonant regulating rectifier 10 according to this embodiment may include an input unit 100 (sometimes referred to as "input circuit") and a resonant regulating rectification unit 200 (sometimes referred to as "resonant regulating rectification circuit").

The input unit 100 is provided to receive wireless power.

The input unit 100 may change the received wireless power, i.e., AC voltage $V_{INN}$, $V_{INP}$, into a half-wavelength by a cross-coupled structure N1, N2.

The resonant regulating rectification unit 200 may be provided to modulate and rectify a voltage level $V_{INN}$ of wireless power received from the input unit 100 so as to apply the voltage to a load.

Specifically, the resonance regulating rectification unit 200 according to this embodiment may modulate and rectify a voltage level of wireless power based on PWM according to a first demand voltage $V_{REG}$ of a first load and a second demand voltage $V_{ER}$ of a second load, thereby applying a first target voltage $V_{TG1}$ to the first load through a first output transistor $P_1$, and applying a second target voltage $V_{TG2}$ to the second load through a second output transistor $P_9$.

Figure 5:
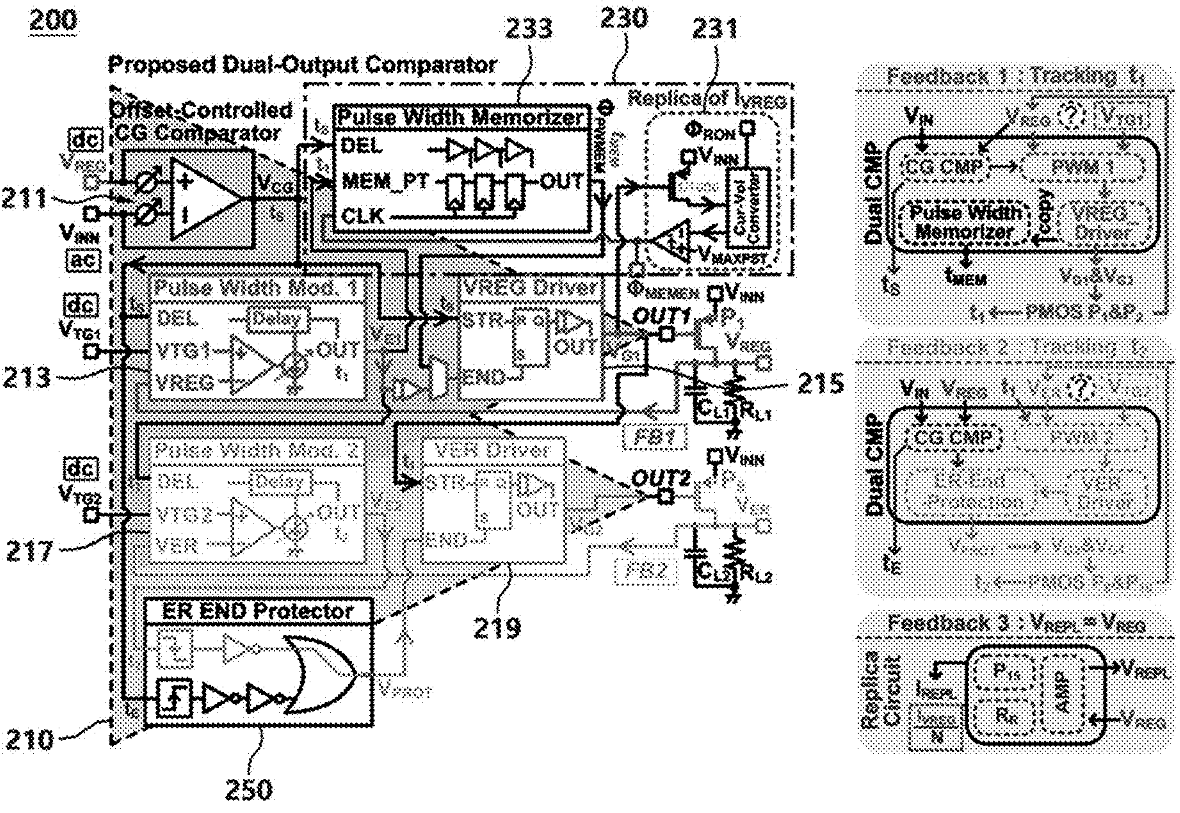
FIG. 5 is a circuit diagram for explaining an operation of a dual output comparator according to one embodiment of the present disclosure.

FIG. 5 is a circuit diagram for explaining a dual output comparator 210 (sometimes referred to as "dual output comparator circuit") according to one embodiment of the present disclosure, and as shown in FIG. 5, the resonant regulating rectification unit 200 may include a dual output comparator 210, a first pulse width limiter 230, and a second pulse width limiter 250.

The resonant regulating rectification unit 200 according to this embodiment generates two outputs to generate another output in the wasted section in FIG. 3. Therefore, the resonant regulating rectification unit 200 requires two pulse width signals, that is, a first gate signal $V_{G1}$ and a second gate signal $V_{G2}$, to regulate the two outputs.

The dual output comparator 210 according to this embodiment is provided to generate the first and second gate signals $V_{G1}$, $V_{G2}$.

The dual output comparator 210 may apply a first gate signal $V_{G1}$ in consideration of the first demand voltage $V_{REG}$ to a gate of the first output transistor $P_1$ within a section where the voltage level $V_{INN}$ is greater than the first demand voltage V REG.

Furthermore, the dual output comparator 210 may apply a second gate signal $V_{G2}$ in consideration of the second demand voltage $V_{ER}$ to a gate of the second output transistor $P_9$ within a section where the voltage level $V_{INN}$ is greater than the first demand voltage $V_{REG}$.

To this end, the dual output comparator 210 includes a common gate comparator (Offset Controlled CG (common gate) Comparator) 211, a first PWM circuit (Pulse Width Mod. 1) 213, a first demand voltage driver ($V_{REG}$ Driver) 215, a second PWM circuit (Pulse Width Mod. 2) 217, and a second demand voltage driver ($V_{ER}$ Driver) 219.

The common gate comparator 211 may output a common gate voltage signal $V_{CG}$ including information on a start point $t_S$ and an end point the of the section as a difference between the voltage level $V_{INN}$ and the first demand voltage $V_{REG}$, such as one cycle of the voltage level (1 Cycle of $V_{INN}$) as shown in FIG. 4.

Since the common gate comparator 211 outputs a common gate voltage signal $V_{CG}$ that falls at the start point $t_S$ of the section and rises at the end point the of the section, the common gate voltage signal $V_{CG}$ may include information on the start point $t_S$ and end point $t_E$ of the section.

Unlike conventional systems that typically use two pairs of offset modulation common-gate comparators to produce two outputs, the dual output comparator 210 according to this embodiment may reduce power consumption by using only one pair of common-gate comparators 211.

Meanwhile, the first PWM circuit 213 may output a first delay signal $V_{E1}$ including information on an end point $t_1$ of the first gate signal $V_{G1}$ that allows the first target voltage $V_{TG1}$ to satisfy the first demand voltage $V_{REG}$.

To this end, the first PWM circuit 213 according to this embodiment may receive the first target voltage $V_{TG1}$, the first demand voltage $V_{REG}$, and the common gate voltage signal $V_{CG}$ including information on the start point $t_S$ of the section together.

Furthermore, the first PWM circuit 213 delays the common gate voltage signal $V_{CG}$ by the end point $t_1$ of the first gate signal $V_{G1}$ that allows the first demand voltage $V_{REG}$ to be the same as the first target voltage $V_{TG1}$ so as to output a delay signal $V_{E1}$ that falls at the end point $t_1$.

Meanwhile, the first demand voltage driver 215 may generate the first gate signal $V_{G1}$ according to the common gate voltage signal $V_{CG}$ and the first delay signal $V_{E1}$.

The first demand voltage driver 215 may receive the common gate voltage signal $V_{CG}$ to generate a falling edge STR at the start point $t_S$ of the section.

Furthermore, the first demand voltage driver 215 may select (MUX) a signal indicating a previous point from between the first delay signal $V_{E1}$ and the end point threshold signal $\Phi_{PWMEM}$ Of the first gate signal $V_{G1}$. To this end, the first demand voltage driver 215 may receive the end point threshold signal $\Phi_{PWMEM}$ Of the first gate signal $V_{G1}$ from the first pulse width limiter 230. In this case, the end point threshold signal $\Phi_{PWMEM}$ of the first gate signal $V_{G1}$ may denote a maximum value of the first gate signal $V_{G1}$.

In addition, the first demand voltage driver 215 may generate a rising edge END at a point corresponding to the selected signal to generate the first gate signal $V_{G1}$.

Meanwhile, the second PWM circuit 217 may output a second delay signal $V_{E2}$ including information on the end point $t_2$ of the second gate signal $V_{G2}$ to allow the second target voltage $V_{TG2}$ to be the same as the second demand voltage $V_{ER}$.

The second PWM circuit 217 according to this embodiment may receive a first delay signal $V_{E1}$ including information on the end point $t_1$ of the first gate signal $V_{G1}$ together with the second target voltage $V_{TG2}$ and the second demand voltage $V_{ER}$.

Furthermore, the second PWM circuit 217 may delay the first delay signal $V_{E1}$ by a time period obtained by subtracting the end point $t_1$ of the first gate signal $V_{G1}$ from the end point $t_2$ of the second gate signal $V_{G2}$ to output the second delay signal $V_{E2}$ that falls at the end point $t_2$ of the second gate signal $V_{G2}$.

Meanwhile, the second demand voltage driver 219 may generate the second gate signal $V_{G2}$ according to the first gate signal $V_{G1}$ and the second delay signal $V_{E2}$.

The second demand voltage driver 219 may receive the first gate signal $V_{G1}$ to generate a falling edge STR at the end point $t_1$ of the first gate signal $V_{G1}$.

Furthermore, the second demand voltage driver 219 may receive an end point threshold signal $t_2$ of the second gate signal $V_{G2}$ from the second pulse width limiter 250 to generate the second gate signal $V_{G2}$ by producing a rising edge END at a preceding point from between the end point the of the section and a point that satisfies the second demand voltage $V_{ER}$.

The second demand voltage driver 219 will be specifically described together with the second pulse width limiter 250 in FIG. 8, which will be described later.

Meanwhile, when a pulse width of the first gate signal $V_{G1}$ applied according to this embodiment is too long, there will be no space for the second gate signal $V_{G2}$ to be present, and on the contrary, when a pulse width of the second gate signal $V_{G2}$ is too long such that the voltage level $V_{INN}$ and the DC voltage $V_{REG}$ exceed the same point, a back current will occur.

Therefore, a device that controls maximum pulse widths of the first gate signal $V_{G1}$ and the second gate signal $V_{G2}$, respectively, may be required, and in order to control the maximum pulse widths, the resonant regulating rectification unit 200 according to this embodiment may include a first pulse width limiter 230 and a second pulse width limiter 250.

Meanwhile, the first pulse width limiter 230 may limit a pulse width of the first gate signal $V_{G1}$ by transmitting an end point threshold signal $\Phi_{PWMEM}$ of the first gate signal $V_{G1}$ including critical point information $t_{mem}$ for the second gate signal $V_{G2}$ that follows the first gate signal $V_{G1}$ to be present within a section $t_S$-$t_E$ to the first demand voltage driver 215.

To this end, the first pulse width limiter 230 includes a current replicator (Replica circuit of $I_{VREG}$ 231) and a voltage width storage device 233.

Figure 6:
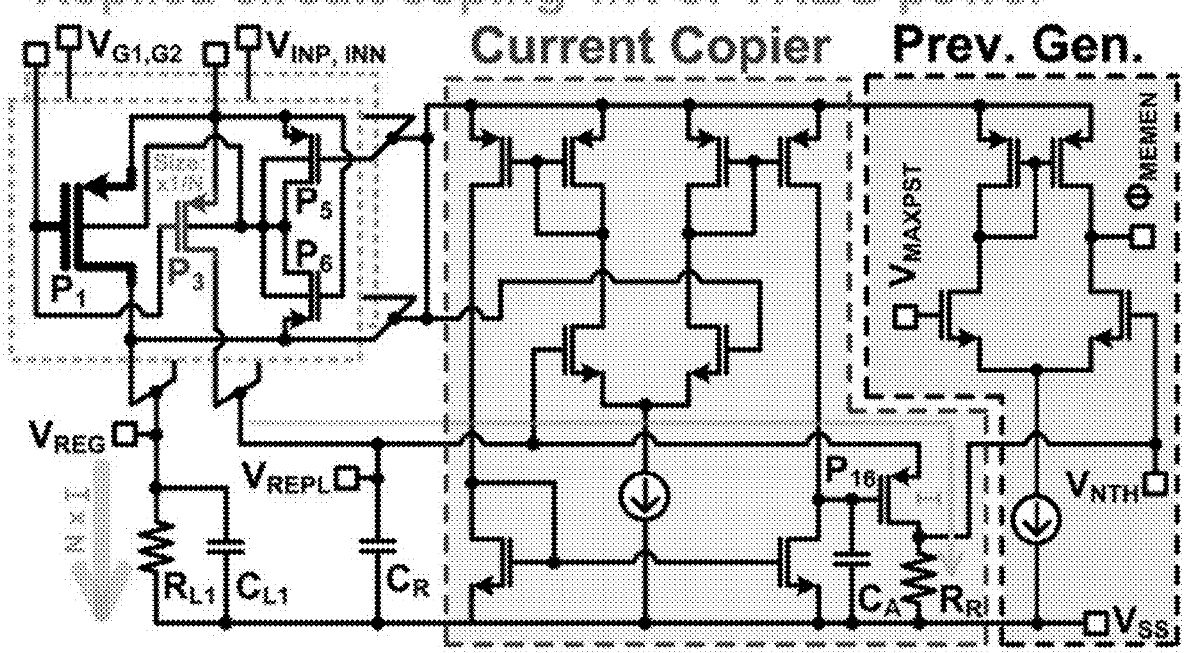
FIG. 6 is circuit diagram for explaining a current replicator according to one embodiment of the present disclosure.

FIG. 6 is a circuit diagram for explaining the current replicator 231 according to one embodiment of the present disclosure.

The current replicator 231 according to this embodiment may include a replication transistor $P_3$ and a current-to-voltage converter (Cur-Vol Converter).

First, the replication transistor $P_3$ may be connected in parallel with the first output transistor $P_1$ to replicate a current flowing in the first output transistor $P_1$.

For instance, the replication transistor $P_3$ may have a size that is 1/1000 of that of the first output transistor $P_1$ in order to replicate a magnitude of current that is 1/1000 of that of the first output transistor $P_1$.

Meanwhile, the current-to-voltage converter (Cur-Vol Converter) may convert a drain current of the replication transistor $P_3$ into a voltage value $V_{NTH}$.

That is, the current-to-voltage converter (Cur-Vol Converter) may convert a current value replicated by the replication transistor $P_3$ into a voltage value $V_{NTH}$ to facilitate interpretation.

Through such a configuration, the current replicator 231 may output a signal notifying when the converted voltage value exceeds a critical value.

More specifically, the current replicator 231 may generate a voltage value $V_{NTH}$ by replicating a current flowing to a first output $R_{L1}$ by 1/N as shown in FIG. 6.

Furthermore, the current replicator 231 may change a $\Phi_{MEMEN}$ Signal from 0 to 1 and transmit a command to the voltage width storage device 233 to memorize a current voltage width of the first gate signal $V_{G1}$ when power flowing to the first output $R_{L1}$ reaches a specific designated power (e.g., 100 mW) using the generated voltage value $V_{NTH}$.

Therefore, a difference value between the end point $t_1$ of the first gate signal $V_{G1}$ and the start point $t_S$ of the section, which has been currently identified, may be fixed to fix a length of the first gate signal $V_{G1}$ so as to no longer change from now on such that falling at the start point $t_S$ of the section is to rise at the end point $t_1$ of the first gate signal $V_{G1}$.

Figure 7:
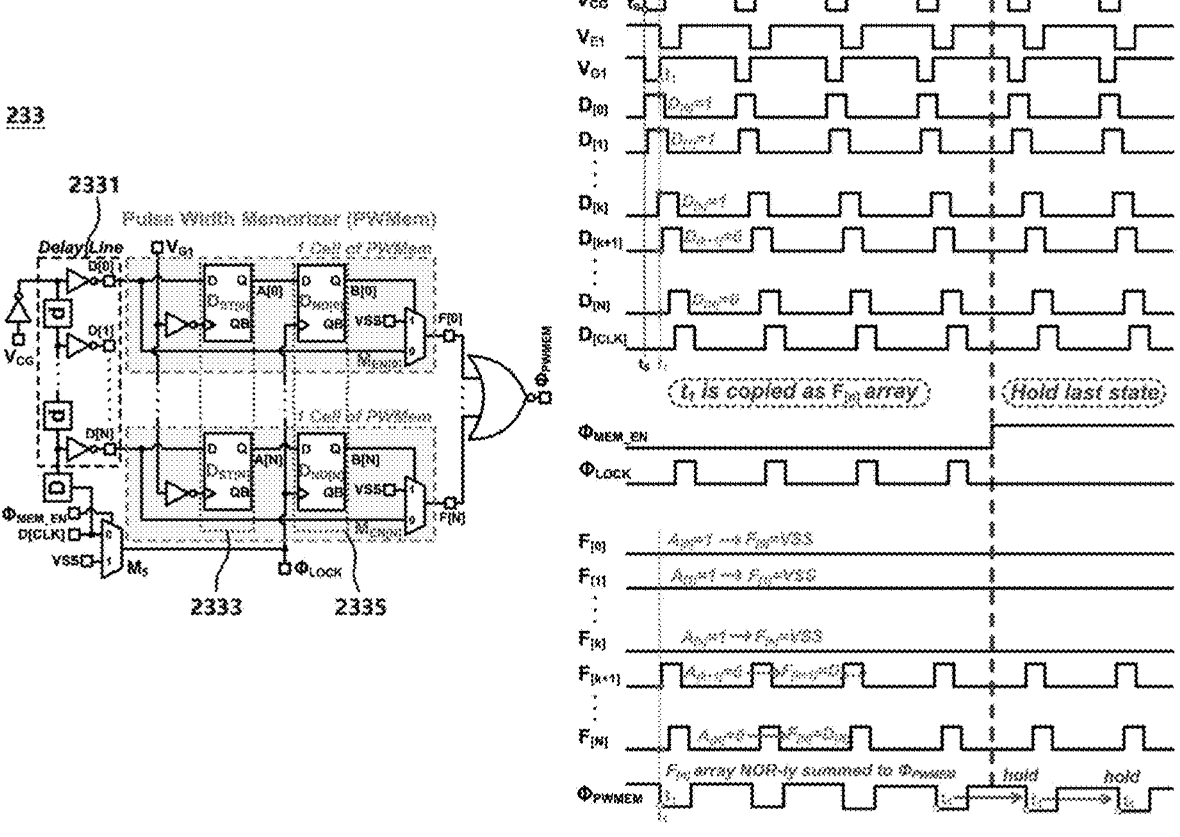
FIG. 7 is a circuit diagram and a timing diagram for explaining a voltage width storage device according to one embodiment of the present disclosure.

FIG. 7 is a circuit diagram and a timing diagram for explaining the voltage width storage device 233 according to one embodiment of the present disclosure.

The voltage width storage device 233 according to this embodiment may be provided in the dual output comparator 210, and provided to lock and memorize a voltage width length of the first gate signal $V_{G1}$ by utilizing the current replicator 231.

The voltage width storage device 233 may include a delay line 2331, a first D-flipflop group 2333, and a second D-flipflop group 2333.

The delay line 2331 may delay the common gate voltage $V_{CG}$ by a predetermined delay unit from the start point $t_S$ of the section $t_S$-$t_E$.

Furthermore, the first D flip-flop group 2333 may continuously convert a width of the first gate signal $V_{G1}$ into a digital value based on the predetermined delay unit.

The second D-flipflop group 2335 continuously update the converted digital value. In addition, the second D flip-flop group 2335 may fix a voltage width length of the first gate signal $V_{G1}$ to a digital value of the first D flip-flop group 2333 when a drain current value of the first output transistor reaches a critical value, that is, changes from 0 to 1.

Specifically, as shown in FIG. 7, assuming that the start point $t_S$ of the section $t_S$-$t_E$ is 100 seconds and d, which is a constant delay unit, is 1 second, the delay line 2331 may delay the common gate voltage $V_{CG}$ by 100 seconds (start point $t_S$ of the section $t_S$-$t_E$), 101 seconds $t_S$+d, 102 seconds $t_S$+2d, 103 seconds $t_S$+3d, . . . , 100+N seconds $t_S$+Nd.

Accordingly, an array of $D_{ST}[0]$ to $D_{ST}[N]$ of the second D flip-flop group 2335 may identify a value corresponding to which one of times that are delayed from the end point $t_1$ of the first gate signal $V_{G1}$.

For instance, when the end point $t_1$ of the first gate signal $V_{G1}$ is currently $t_S$+5d, it may be determined to be 105 seconds.

Through this, the voltage width storage device 233 may lock the converted digital value when a signal is received from the current replicator 231 to memorize a voltage width at the locked time as critical point information $\Phi_{PWMEM}$.

In other words, in the voltage width storage device 233, when the first demand voltage $V_{REG}$ exceeds a pre-specified threshold value, $\Phi_{Lock}$ changes from 0 to 1, and an array of $D_{ND}[0]$ to $D_{ND}[N]$ of the second D flip-flop group 2335 may be fixed (locked) to 105 seconds that has been previously identified.

Therefore, the voltage width storage device 233 may output only $t_S$+5d as the critical point information $\Phi_{PWMEM}$ such that the first gate signal $V_{G1}$ is fixed only to a section from the start point $t_S$ of the section to $t_S$+5d.

Meanwhile, the second pulse width limiter (ER END Protector) 250 may be provided to limit a pulse width of the second gate signal $V_{G2}$.

Figure 8:
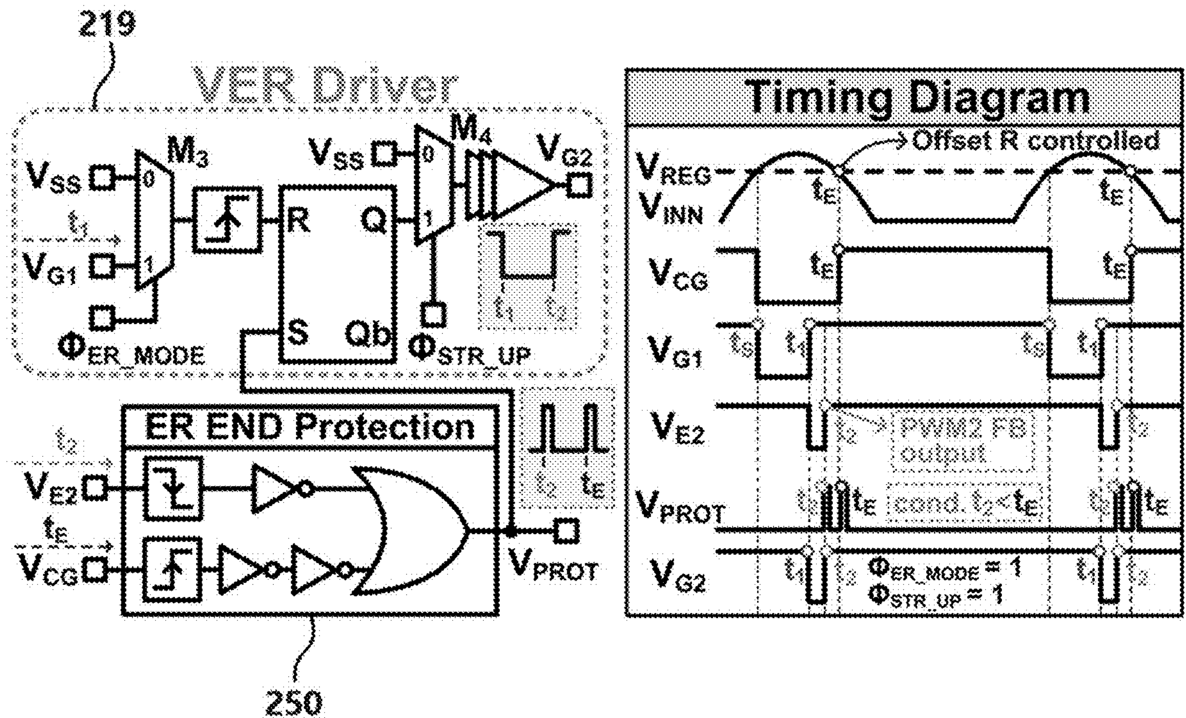
FIG. 8 is a circuit diagram and a timing diagram for specifically explaining a second pulse width limiter according to one embodiment of the present disclosure.

FIG. 8 is a circuit diagram and a timing diagram for specifically explaining a second pulse width limiter 250 according to one embodiment of the present disclosure.

The second pulse width limiter 250 is provided to set the end point $t_E$ from between the start point $t_S$ and the end point $t_E$ of the section where the first demand voltage $V_{REG}$ derived by the common gate comparator 211 and the voltage level $V_{INN}$ match to a maximum value of a time point at which the second gate signal $V_{G2}$ ends.

To this end, the second pulse width limiter 250 according to this embodiment may receive the second delay signal $V_{E2}$ and the common gate voltage signal $V_{CG}$ and transmit the end point threshold signal $V_{prot}$ of the second gate signal $V_{G2}$ including information on a point that satisfies the second demand voltage $V_{TG2}$ and the end point $t_E$ of the section to the second demand voltage driver 219 so as to limit a pulse width of the second gate signal $V_{G2}$.

Through this, when the end point threshold signal $V_{prot}$ of the second gate signal $V_{G2}$ is input to the second demand voltage driver 219, a signal that is the earliest from between a point $t_2$ that satisfies the second demand voltage $V_{TG2}$ and the end point $t_E$ of the section may be set as a rising time of the second gate signal $V_{G2}$.

More specifically, as shown in the timing diagram of FIG. 8, the second demand voltage driver 219 may cause the second gate signal $V_{G2}$ to fall at $t_1$ and rise at $t_2$ when $t_2$ is ahead of $t_E$, and cause the second gate signal $V_{G2}$ to fall at $t_1$ and rise at $t_E$ when $t_E$ is ahead of $t_2$. In this case, a maximum end point of the second gate signal $V_{G2}$ may be limited to $t_E$.

The resonant regulating rectifier 10 according to this embodiment may reduce heat generation by resolving a section where energy is wasted.

While various embodiments of the present disclosure have been shown and described above, it will be of course understood by those skilled in the art that various modifications may be made without departing from the gist of the disclosure as defined in the following claims, and it is to be noted that those modifications should not be understood individually from the technical concept and prospect of the present disclosure.

DESCRIPTION OF SYMBOLS

10: Resonant regulating rectifier
100: Input unit
200: Resonant regulating rectification unit
210: Dual output comparator
211: Common gate comparator
213: First PWM circuit
215: First demand voltage driver
217: Second PWM circuit
219: Second demand voltage driver
230: First pulse width limiter
231: Current replicator
233: Voltage width storage device
2331: Delay line
2333: First D-flipflop group
2335: Second D-flipflop group
250: Second pulse width limiter

What is claimed is:

1. A resonant regulating rectifier, comprising:
an input circuit configured to receive wireless power; and
a resonant regulating rectification circuit configured to modulate and rectify a voltage level of the wireless power based on pulse width modulation (PWM) according to a first demand voltage of a first load and a second demand voltage of a second load, to apply a first target voltage to the first load through a first output transistor, and apply a second target voltage to the second load through a second output transistor,
wherein the resonant regulating rectification circuit comprises:
a dual output comparator circuit configured to, within a section in which the voltage level is greater than the first demand voltage,
apply a first gate signal in consideration of the first demand voltage to a gate of the first output transistor, and
apply a second gate signal in consideration of the second demand voltage to a gate of the second output transistor.

2. The resonant regulating rectifier of claim 1, wherein the dual output comparator circuit comprises:
a common gate comparator configured to output a common gate voltage signal including start point and end point information of the section as a difference between the voltage level and the first demand voltage;
a first PWM circuit configured to output a first delay signal including end point information of the first gate signal that causes the first target voltage to satisfy the first demand voltage;
a first demand voltage driver configured to generate the first gate signal according to the common gate voltage signal and the first delay signal;
a second PWM circuit configured to output a second delay signal including end point information of the second gate signal that causes the second target voltage to satisfy the second demand voltage; and
a second demand voltage driver configured to generate the second gate signal according to the first gate signal and the second delay signal.

3. The resonant regulating rectifier of claim 2, wherein the resonant regulating rectification circuit further comprises:
a first pulse width limiter configured to transmit an end point threshold signal of the first gate signal, which includes critical point information for the second gate signal that follows the first gate signal to be present within the section, to the first demand voltage driver so as to limit a pulse width of the first gate signal; and
a second pulse width limiter configured to
receive the second delay signal and the common gate voltage signal, and
transmit an end point threshold signal of the second gate signal, which includes information of a point that satisfies the second demand voltage and the end point information of the section, to the second demand voltage driver so as to limit a pulse width of the second gate signal.

4. The resonant regulating rectifier of claim 3, wherein the first demand voltage driver is configured to:
receive the common gate voltage signal;
in response to the common gate voltage signal, generate a falling edge of the first gate signal at a start point of the section;
select a signal indicating a preceding point from between the first delay signal and the end point threshold signal of the first gate signal; and
generate a rising edge of the first gate signal at a point corresponding to the selected signal.

5. The resonant regulating rectifier of claim 3, wherein the second demand voltage driver is configured to:
receive the first gate signal;
in response to the first gate signal, generate a falling edge of the second gate signal at an end point of the first gate signal;
receive the end point threshold signal of the second gate signal; and
in response to the end point threshold signal of the second gate signal, generate a rising edge of the second gate signal at a preceding point from between a point that satisfies the second demand voltage and an end point of the section.

6. The resonant regulating rectifier of claim 3, wherein the first pulse width limiter comprises:
a replication transistor connected in parallel to the first output transistor to replicate a current flowing in the first output transistor;
a current replicator comprising a current-voltage converter configured to convert a drain current of the replication transistor into a voltage value,
wherein the current replicator is configured to output a notifying signal in response to the voltage value exceeding a critical value; and
a voltage width storage device comprising:
a delay line configured to delay the common gate voltage signal by a predetermined delay unit from a start point of the section,
a first D-flipflop group configured to convert the pulse width of the first gate signal into a digital value based on the predetermined delay unit, and
a second D-flipflop group configured to update the digital value,
wherein the voltage width storage device is configured to, in response to the notifying signal received from the current replicator, lock the digital value to memorize the pulse width corresponding to the locked digital value as the critical point information.

* * * * *